Aug. 1, 1967  J. A. DANIEL, JR  3,333,521
CAMERA VIEWFINDER

Filed Dec. 18, 1964  4 Sheets-Sheet 1

INVENTOR
James A. Daniel, Jr.

BY Tourover & Browdy

ATTORNEY

INVENTOR
James A. Daniel, Jr.
BY Tourover & Browdy
ATTORNEY

INVENTOR
James A. Daniel, Jr.

3,333,521
CAMERA VIEWFINDER
James A. Daniel, Jr., R.D. 2, Box 66,
Newton, N.J. 07860
Filed Dec. 18, 1964, Ser. No. 419,347
13 Claims. (Cl. 95—44)

The present invention relates to a camera, and more particularly, a large, press-type camera capable of accurately taking extreme close-ups free of parallax while being hand held.

The problem of parallax is a major problem in cameras other than the single lens reflex type. When a viewfinder or sports-finder is used for the eye, the eye field of vision is different from the camera field of vision, i.e., there is framing error in that the eye sees one picture and the camera sees a slightly different picture and this is known as parallax.

The problem of parallax becomes acute for a close-up, since if the camera is focused in for a close-up, there is danger of cutting off the top of the subject's head, because the line of sight of the viewer is a little distance from the optical axis of the lens.

In addition to framing error or parallax, a field size error occurs, particularly in larger cameras, as the camera focuses for close-ups. Field size error occurs because the viewfinder or sports-finder is provided to more or less correspond to the camera at infinity or at least farther than a close-up. When the taking lens is focused for close subjects, the distance between such lens and the film increases, but the actual negative size stays the same which in turn decreases the angle view slightly. A fixed frame viewer then indicates the wrong size of field. In those instances where the sports-finder may be adjusted, it must be done manually which is slow and inaccurate. For a close-up the lens to film distance increases and correspondingly the angle of view through the viewfinder decreases; however, in conventional finders the view does not decrease sufficiently. At great distances, such as infinity, slight changes in the lens to film distance are negligible, but at close-up distances these changes become critical.

Conventional finders are generally adequate at only distances approaching infinity. Parallax compensation devices have been provided for cameras having a separate viewfinder, but these have been useful only for a distance of greater than two or three feet away from the subject. This problem is particularly acute in large, press-type cameras.

The prior art has not developed a viewfinder or sports-finder, particularly for a large camera, which automatically keeps the field of view the same size as the camera field of view and, at the same time, maintains the same field of view (no parallax) regardless of focus.

In addition, unlike small ground-glass focusing cameras, large press-type cameras do not have built-in focusing magnifiers for focusing and viewfinding. In the past, such focusing devices have been used with large cameras only when the camera has been mounted on a tripod so that both hands of the operator are free; in such a case one hand is needed to hold the focusing device and the other to operate the focusing knob.

It is therefore an object of the present invention to overcome the problems of the prior art, such as those indicated above.

It is another object of the present invention to provide a camera, particularly of the large, press-type, capable of accurately taking extreme close-ups free of parallax while being hand held.

It is another object of the present invention to provide a camera having a sports-finder which automatically and simultaneously keep the eye field of view the same size and over the same area (no parallax) as the camera field of view regardless of the camera focus.

It is another object of the present invention to provide a camera having a viewing unit and also a focusing unit, both of which automatically move together with the taking lens to maintain the taking lens and view frame of the finder and focusing lens in synchronized position along any point of linear travel of the taking lens so that the taking and focusing lenses focus on the same subject and the taking lens and the finder view frame cover the same field of vision free of parallax regardless of the linear position of the taking lens.

It is another object of the present invention to provide a viewfinder which will automatically, when the camera is being focused, correct parallax and frame the subject being photographed exactly as it will be framed on the film regardless of focus.

It is another object of the present invention to provide means of synchronizing a focusing lens and a taking lens when the two lenses are not identical.

It is another object of the present invention to provide a simple-to-operate and highly effective apparatus for accomplishing the above objects.

Other objects and the nature and advantages of the instant invention will be apparent from the following description of an exemplary embodiment of the invention taken in conjunction with the accompanying drawings, wherein.

Figure 6:
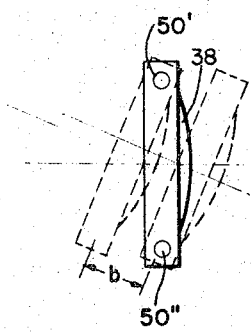
FIG. 6 is a plan view of a detail of the present invention.

A camera in accordance with the present invention is shown generally at 10. The camera 10 is a 4″ x 5″ press camera which is considered to be a large camera by today's standards. The press camera 10 comprises a picture taking portion 12, a focusing unit 14 and a sports-finder unit 16. The picture taking portion 12 is more or less of the conventional press camera type.

The camera 10, particularly the picture taking portion 12, comprises a body 18, within which is maintained the film. Attached to the front bottom of the body 18 in a manner well-known is a camera bed 20 provided with track guides 22 between which is slidably mounted camera front tracks on a base 24. The front tracks and base 24 are adapted to slide linearly within the track guides 22 to provide focusing of the camera. This is accomplished in a manner well-known by providing a rack on the tracks which engages a pinion rotatably mounted on the camera bed 20. This pinion is rotated by a focusing knob or thumb-piece 26, the rack, pinion and thumb-piece serving as a means to move the camera taking lens linearly towards or away from the film in the body 18 to effect focusing.

The tracks and base 24 support an upstanding front framework 28 which in turn supports a camera taking lens assembly 30 containing a taking lens 31. A light tight bellows 32 is provided between the taking lens assembly 30 and the body 18 containing the camera film. Various other elements conventionally present on a large press-type camera may also be present on the camera 10 and certain of these features are illustrated without being described.

Figure 1:
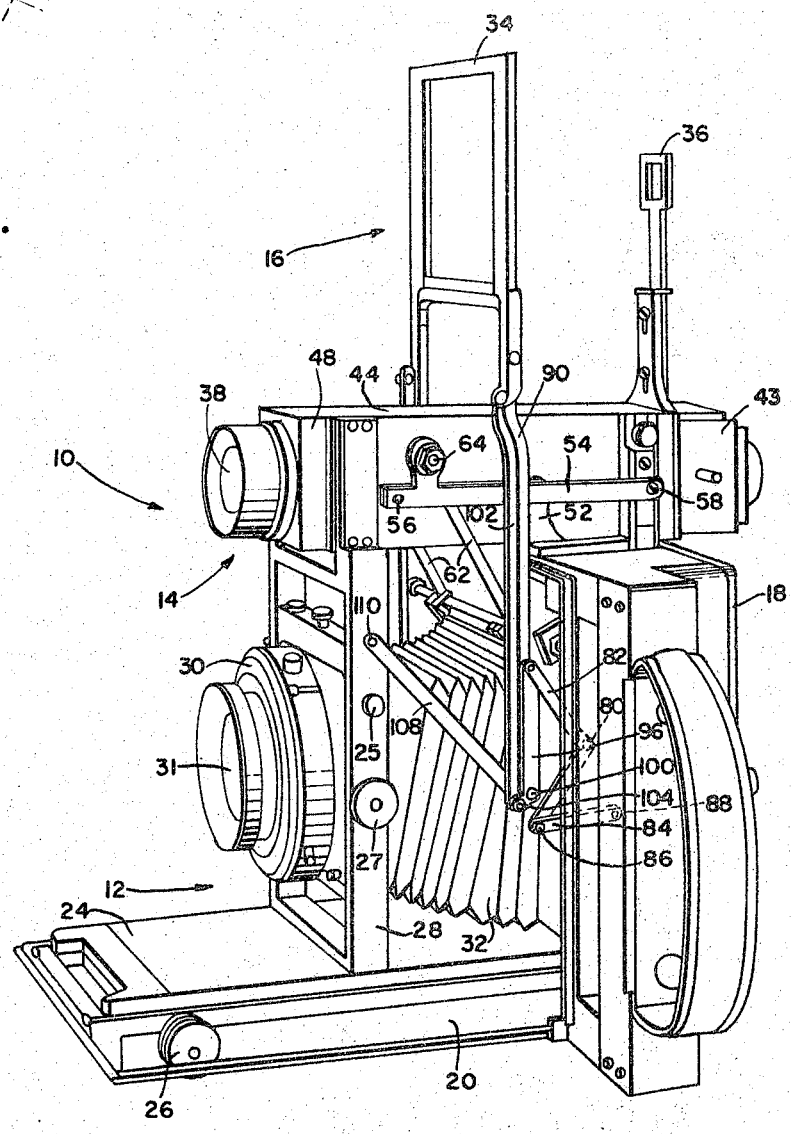
FIG. 1 is a perspective view of one embodiment of the present invention at focus infinity.
Figure 2:
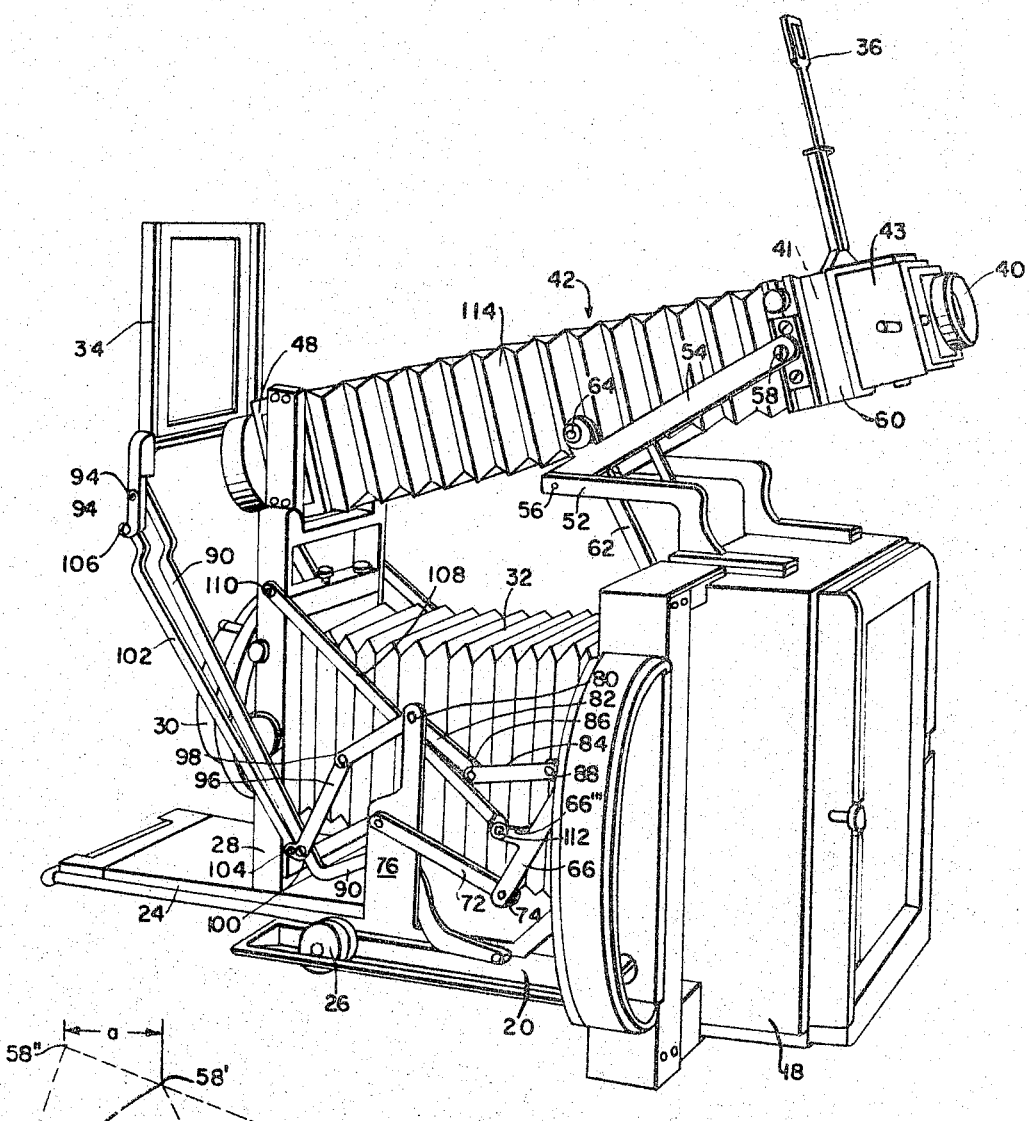
FIG. 2 is another perspective view from a slightly different angle from FIG. 1 of the same embodiment at a close-up focus.

An important part of the present invention is the provision of a sports-finder unit 16 which automatically keeps the field of view the same size as the field of view of the camera through the taking lens 31 and at the same time maintains the field of view over the same area as the camera lens 31, i.e., no over-lap or varience in area covered between what is seen through the sports-finder and what the camera sees (no parallax). The sports-finder comprises a view frame 34 and a peep-sight 36. As the front framework 28 is advanced from focus infinity as shown in FIG. 1 to closeup focus as shown in FIG. 2 by rotation of the thumb-piece 26, the view frame 34 automatically moves with the taking lens 31, but at a faster rate, by means of a suitable supporting means, described below. The supporting means maintains the taking lens 31 and the view frame 34 in synchronized position along any point of linear travel of the taking lens so that the taking lens 31 and the view frame 34 cover the same field of vision free of parallax regardless of the linear position of the taking lens 31.

Figure 4:
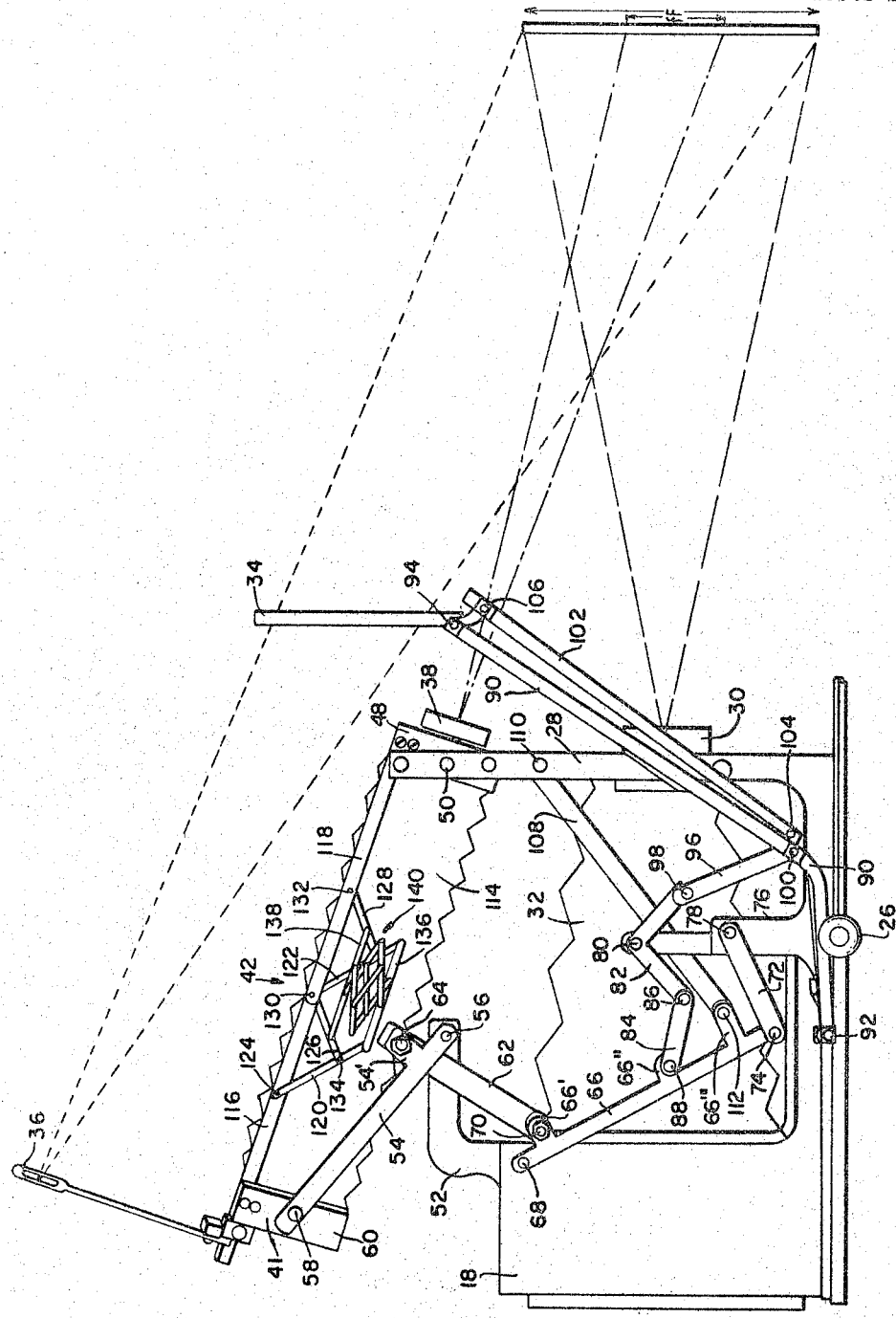
FIG. 4 is a schematic diagram of another embodiment of the present invention.

As can be seen by a comparison of FIGS. 1 and 2, the supporting means acts to progressively move the view frame 34 in a downward arc from a position behind the plane of the taking lens 31, at infinity focus, to a position in front of the plane of the taking lens 31, at a close-up focus. As seen in FIG. 4, even at an extreme close-up the field of view through the sports-finder view frame 34 is the same as the view through the camera taking lens 31.

Comparing FIG. 1, 2 and 4, the sports-finder view frame 34 moves downwardly and forwardly in an arc at a fast rate at the same time that the taking lens 31 moves linearly forwardly, the peep-sight 36 also moving upwardly in an arcuate motion. It may be noted that the supporting means, which automatically maintains the sports-finder in proper synchronized position with the taking lens 31, accelerates the view frame 34 in its arc of travel forwardly in the middle distance and downwardly as extreme close-up focus is approached. It has been found (FIG. 1) that the view frame 34 is best provided at a position approximately one-half way between the plane of the taking lens 31 and the plane of the film in the body 18 at focus infinity.

The view frame 34 may be removable from its support to be changed from the vertical position to a horizontal. The frame 34 is made approximately one-third smaller than the film size to reduce the amount of movement needed to keep the field of view accurate at all distances. The view frame 34 is always maintained parallel to the front framework 28 or vertical regardless of its position of travel between infinity focus and close-up focus; this maintains the field of vision the proper size regardless of the focus.

Another feature of the present invention is the provision on the camera 10 of the focusing unit 14. The focusing unit 14 comprises a focusing lens 38 and a cooperative ground glass focusing screen 41 in a housing 60; in addition, an eye lens 40 in an eye lens housing 43 may be provided over the ground glass 41 for easy removal from the ground glass housing 60. The focusing unit 14 is used for range finding, critical focusing, centering of the subject, and adjusting the focus for a moving subject. As with the sports-finder 16, the focusing unit 14 is supported and controlled by the supporting means so that the device is maintained in synchronized position with the taking lens regardless of the focus of the camera. In addition, a straight line expanding and contracting unit 42 is provided to maintain the planes of the focusing lens 38 and the ground glass 41 (and eye lens 40, if used) parallel regardless of their tilt and separation and this expanding unit in part of the overall supporting means. The expanding unit may comprise a pair of telescoping tubes or hollow chambers such as the tube 44 as shown in FIG. 1; it may comprise the more complicated, but preferred, unit illustrated in FIGS. 2 and 4 and described below; or it may comprise any other suitable straight-line expanding device.

The focusing lens 38 is mounted in a support or housing 48 which is pivotally mounted on the front framework 28 at a pivot 50. The focusing lens 38 is thereby mounted for linear movement with the taking lens 30 as the front framework 28 is moved linearly by the thumb screw 26. This automatically insures that both the taking lens 31 and the focusing lens 38 are always in synchronized position so that they are always focused together. In addition, the supporting means, described below, acts to progressively tilt the focusing lens 38 to a downwardly pointing direction as the lenses are moved linearly from infinity focus to close-up focus so that both the taking lens 31 and focusing lens 38 both point to the same subject regardless of the focus.

In the illustrated camera 10, an identical taking lens 31 and focusing lens 38 are not necessary. The focusing lens 38 is preferably of a shorter focal length than the taking lens 31 as this permits a shorter mount with less interference in inserting the film holder (the film holder may be inserted vertically) and more accurate focusing of extreme close-ups with the camera parallel to the copy due to a slightly longer distance from the subject of the focusing lens. A shorter focal length lens 38 also permits better mounting of a magnifying lens and light shield around the ground glass 41, if desired, by providing additional distance. It also permits selection of the focusing lens 38 for light gathering power rather than covering power and permits a lower cost lens to be used. As shown in FIG. 4, the focusing lens 38 need not encompass the entire field of vision F of the taking lens or the sports finder, but is satisfactory if it only focuses on the center f of the field of view of the taking lens 31.

While the supporting means tilts the focusing lens 38 as the focusing and taking lenses 38 and 31, respectively, move linearly to focus from infinity to close-up, the supporting means also acts to progressively raise the ground glass 41 in an arc at the same rate that the focusing lens 38 is tilted to a downwardly direction so that the planes of the ground glass 41 (and eye lens 40) and the focusing lens 38 are always maintained parallel.

One of the important features of the present invention resides in the provision of suitable supporting means which are functionally set forth above. One embodiment of a suitable supporting means (illustrated in FIGS. 1, 2 and 4) comprises, besides the front framework 28, a series of pivotally mounted bars, arms and other supporting elements. Two sets of supporting means are generally provided for the camera 10, one along each side as illustrated in FIGS. 1 and 2, and this provides increased strength and rigidity; however, only one supporting means set will be described and it will be understood that only one set is essential although supporting means on both sides of the camera are preferred.

A first L-shaped support arm 52 is provided rigidly attached to the body 18 of the camera 10. A second or connecting arm 54 is rotatably mounted at a pivot 56 to the first support arm 52; preferably the pivot 56 is located at the extremities of both the first support arm 52 and the second arm 54. The other extremity of the second arm 54 is rotatably attached at a pivot 58 to the support or housing 60 for the ground glass 41. The ground glass housing 60 in turn rigidly supports the peep-sight 36 so that both the peep-sight 36 and the ground glass 41 are pivotally supported at one extremity of the second arm 54. An additional segment 54′ is provided on the second arm 54.

A first linkage 62 is mounted at one of its extremities to the segment 54′ of the second arm 54 via an adjustable pivot 64. A third support arm 66 is attached at one of its extremities to the camera body 18 for rotation about a pivot 68. The third support arm 66 is provided with a first segment 66' to which is mounted the other extremity of the first linkage 62 for rotation thereabout via an adjustable pivot 70.

A second linkage 72 is mounted at one of its extremities to the other extremity of the third support arm 66 via a pivot 74. A fourth support arm 76 is rigidly connected to the base 24 and slides therewith along with the front framework 28. The other extremity of the second linkage 72 is rotatably mounted on the fourth support arm 76 at a pivot 78.

At its upper extremity, the fourth support arm 76 is provided with another pivot point 80 at which a curved rod linkage 82 is mounted. A third linkage 84 is rotatably mounted at one of its extremities to an extremity of the first curved rod 82 via a pivot 86. The other extremity of the third linkage 84 is mounted to an extension 66" of the third arm 66 via a pivot 88.

A fifth arm 90 is mounted at one of its extremities to the base 24 at a pivot 92; the fifth arm 90 thereby moves with the base 24 along with the fourth arm 76. At the other extremity of the support arm 90 is located the view frame 34 to which the support arm 90 is connected by a pivot 94. The fifth support arm 90 is curved in both the embodiments of FIG. 2 and FIG. 4; however, in the embodiment of FIG. 2, the fifth support arm 90 is curved behind the fourth support arm 76 while in the embodiment of FIG. 4, it is curved in front of the fourth support arm 76. The arm 90 is curved because it has also been found that the view frame 34 is best supported from a pivot point near the back of base 24.

A fourth linkage 96 is attached at one of its extremities to the curved rod linkage 82 via a pivot 98 and is also attached near its other end to the fifth support arm 90 via a pivot 100. A sixth arm 102 is connected at one of its extremities to the other extremity of the fourth linkage 96 via a pivot 104 near the pivot 100. At its other extremity, the sixth arm 102 is connected to the view frame 34 via a pivot 106 a slight distance from the pivot 94.

If desired and to further add strength to the structure and reduce the tendency of back pull of the bellows 32, a stabilizer or bracing bar 108 may be connected between a pivot 110 on the front framework 28 and a pivot 112 on an extension 66''' of the second support bar 66.

In using a straight line expanding and contracting unit 42 as shown in FIG. 4, it is desirable to enclose such unit in a bellows 114. The bellows 114 serves to cover the straight line expanding and contracting unit 42 and also serves to keep light away from the area between the ground glass 41 and the focusing lens 38. The expanding and contracting unit 42 is placed along one side or wall of the bellows 114 so as not to interfere with the line of vision between the ground glass 41 and the focusing lens 38.

In the embodiment of FIG. 4, the straight line expanding and contracting unit 42 comprises a first leg 116 rigidly mounted to the ground glass housing 60 and a second leg 118 parallel to the first leg 116 and rigidly mounted to the focusing lens housing 48. A first pair of parallel rods 120 and 122 are pivotally mounted to the first leg 116, the rod 120 being so connected by a pivot 124. A second pair of parallel rods 126 and 128 are mounted on the second leg 118 by pivots 130 and 132, respectively. The rod 126 is connected to the rod 120 at a pivot 134 while the rod 128 is pivotally connected to the rod 122. A third pair of parallel rods 136 and 138 pass between the first two pair of parallel rods, i.e. rod 136 passes between the rods 120 and 122 while rod 138 passes between the rods 126 and 128. Each of the connections of rod 136 and 138 are pivotal. A further device 140 is provided between the parallel rods 136 and 138 in order to prevent such rods from sliding with respect to each other, in order to maintain such rods in the same plane and in order to maintain such rods parallel to one another.

The operation of a camera of the present invention is as follows:

The camera body 18 is similar to most press-type cameras except there is a rigid extension arm 52, used as a support for focusing system.

The camera front-carrier, comprising a front framework 28 with lens board and a base 24 with tracks, henceforth called the camera front, is similar to most press-type cameras except the front framework 28 holding the lens board is extended higher to support another lens 38 for focusing. Also there is an extension 76 rising upward from the base 24 a distance back from the front framework 28. This extension provides a means of attaching control arms. This front carrier may be one piece or several pieces rigidly fastened together.

As indicated above, the camera front is racked-out (focusing closer) by the knob 26. This knob controls all movement of the system.

The arm 66 is pivoted to stationary point on camera body 18 at the point 68 and is linked to the camera front at point 78. Thus this arm 66 is pulled outward as the camera front 28 is extended for focus on close-up objects. The movement of this arm is the basis for all other movements of the system. As the arm 66 moves outwardly it exerts a leverage force from point 70 through the linkage 62 by the connecting arm 54 to raise the ground glass focusing screen 41 at point 58. All other movements of the focusing system follow automatically from this action as the forward movement of the camera front is being extended for closer-up focus.

Also, as the arm 66 moves outwardly, the point 88, on arm 66, progressively separates from the point 80, which is a rigid point on camera front (on arm 76) being racked-out. The separation of these two points provides the movement to accelerate movement of the view frame 34 and this can be seen by a comparison of FIGS. 1 and 4. The view frame being attached to the camera front at point 92 has its own forward movement. It is moved in an arc downwardly while traveling forward by the push given from the linkage extending to arm 66. Point 88 on arm 66, because of a slower rate of movement, exerts a pulling force through the linkage 84 to rotate linkage 82 and give a downward push on arms 90 and 102 through linkage 96. Off-set mounting points of arms 90 and 102 hold the view frame vertical.

When the camera 10 is closed to infinity focus, the shorter focal length focusing lens 38 needs to be closer to its ground glass 41 than the taking lens 31 to its focal plane. This is best taken care of by mounting the ground glass 41 forward of the camera ground glass as this provides more room to insert film and use a magnifying hood 43 or a hood over ground glass. Also the focusing lens 38 can be set a little forward of taking lens 31 to give additional space.

Figure 5:
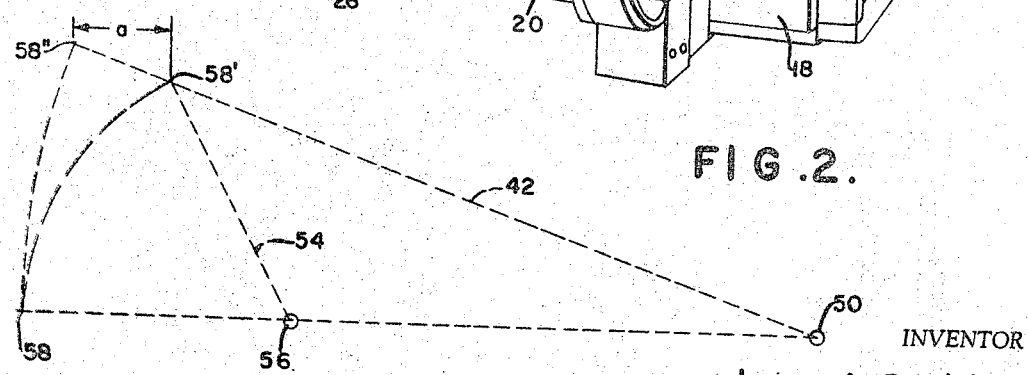
FIG. 5 is a schematic diagram showing the movement of certain elements in relation to one another.
Figure 3:
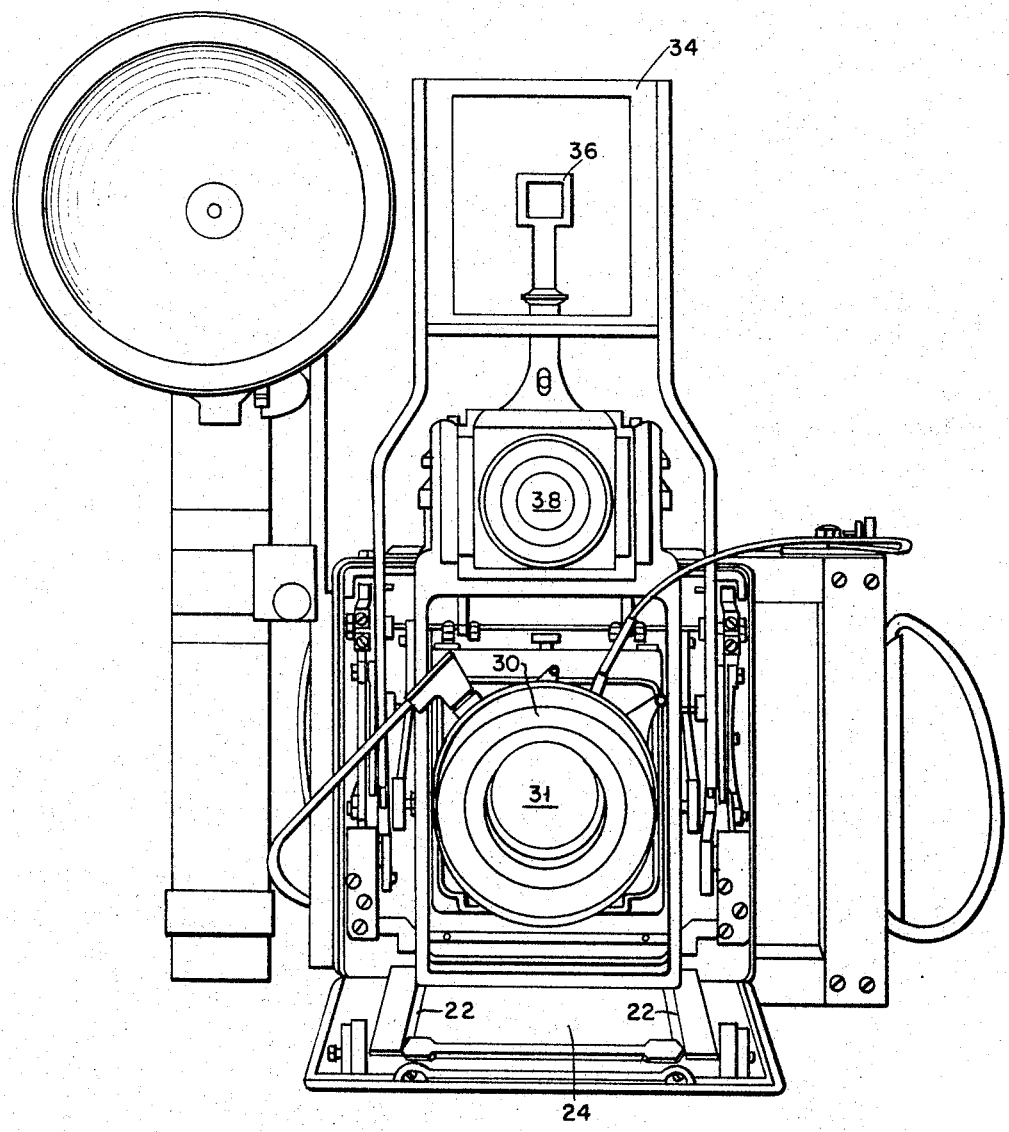
FIG. 3 is a front perspective view of the same embodiment.

It is desirable to provide a focusing lens 38 with a shorter focal length than the taking lens 31. However, when this is done it is necessary to constantly change the distance ratio between the taking lens 31 and the film, on the one hand, and the focusing lens 38 and the ground glass 41, on the other hand, to keep both in focus at the same time. For this reason, the arm 54 provides a holding radius for the ground glass and prevents it from moving away from the focusing lens 38 as quickly as the taking lens 31 moves away from the film plane (note FIG. 5) as the camera is focused for close-up work. Thus, in FIG. 5, if the arm 54 were not present, the pivot point 58 (representing the position of the ground glass 41) would move to position 58" moving around pivot point 50, rather than to the correct position 58' as the camera was focused for close-up work, and the camera would be out of focus with respect to the focusing device by a linear distance equal to $a$.

Thus, when the camera front (24, 28, 76) is extended for close-up work, the ratio of the distance between lens 31 and the film plane and lens 38 and the ground glass 41 is not constant if the lenses 31 and 38 are not of identical focal lengths. Regardless of such ratio, a suitable holding radius for the ground glass 41 can be provided by supplying the arm 54 with a proper length. Once an arm 54 of given length is selected, however, further adjustments can be made by raising or lowering the mounting point 58 on the housing 60.

Considerable adjustment can also be made by raising or lowering the mounting point 50 of the focusing lens housing 48 as shown in FIG. 6. Thus, if the pivot is moved upwardly to the position 50' the lens 38 will move closer to the ground glass 41, while if the pivot is moved downwardly to position 50" the lens 38 will move away from the ground glass 41. The maximum difference in the distance that may be adjusted between the lens 38 and the ground glass 41 is shown by the distance $b$ in FIG. 6. Such a function may be provided in any suitable manner, such as by slidably mounting both the male and female members of the pivot 50, one on the framework 28 and the other on the housing 48. A vertical adjustment of the pivot 50 can be made to compensate for manufacturing errors in the focal length of lens 38.

The common type of sports finder viewing frame is normally fastened to the front of the camera and rides with the front plate when the camera is focused. When using such a camera for a close-up, it is necessary to manually pull the rear side up higher to correct for parallax and even this is not accurate and it is furthermore slow and is a great hindrance in taking action shots. Furthermore, such sports finders are definitely limited in how close they can get to correct parallax and the closer the focus, the more severe the parallax in that the operator sees something different than that is seen by the camera lens. It is also conventional in such devices that the viewing frame is made approximately the same size as the film used. Generally speaking, the larger the camera, the more limited has been the performance in parallax and in field of view.

The present invention, on the other hand, automatically corrects the viewfinder as the camera is being focused; the viewfinder automatically eliminates parallax and frames the subject being photographed exactly as it will be framed on the film to as close as 11 inches with a normal focal lens. It does this by combining the following features:

(1) The viewing frame 34 is about ⅓ smaller than the film size;

(2) The viewing frame 34 is located about one-half way between the lens and the film plane at focus infinity;

(3) The viewing frame 34 moves out at a faster rate of speed than does the taking lens 31 as focusing approaches close-up;

(4) The frame 34 progressively moves forward and drops to a lower level and the speed of drop is accelerated as close-up focus is approached;

(5) The peep-sight 36 is automatically raised simultaneously as the viewing frame 34 moves forwardly and downwardly; and (6) The view frame is held parallel to film plane to give the proper angle perspective to the field of vision.

A great advantage of the present device is that it not only corrects parallax but it also corrects framing of the field of view at different focal lengths.

The camera 10 has great accuracy and speed of operation, particularly for a press-type camera, and it permits extreme close-ups even when the camera is being hand held. The focusing unit 14 may be used for tracking and focusing and it is always synchronized with the taking lens 31.

The camera comprises one interlocking supporting means so that all the parts move automatically by the turn of the camera focusing knobs 26. All the parts move on pivots to reduce play, wear and friction and no springs or cams are necessary or required. The device is foolproof in that one unit cannot be made to move without the other units moving with it and the combined system is rigid at any camera focal point.

As a specific embodiment, a focusing lens 38 may be used of 127 millimeters together with a 135 millimeter taking lens 31. In this embodiment the field size and framing of the sports finder is exact at the point of focus for all distances from infinity to 11 inches. At the same time, when critically focused, the focusing unit is pointed to the same exact center as both the taking lens and the viewfinder. The camera may be used in the hand or on a tripod or other support; in the latter case, the camera can be operated as a standard view camera for structural or special work. The supporting means, sports finder and focusing system in no way interfere with the change of lens, tilt, rise or fall of lens board. A knob 25 is provided to unlock or lock the lens if it is desired to raise, lower or tilt the lens 31 with the knob 27.

In a manner known to a skilled artisan, the speed of the system, direction and amount of movement can be controlled or adjusted by bolts with eccentric heads, by movable pivot points or by variable mounting points. In particular, the pivots 64 and 70 should be adjustable, such as by means of an eccentric head or by being placed in slots for movement in any direction.

Although the invention shown is embodied in a preferred form, it is intended that the disclosure be illustrative rather than definitive. Thus, for example, the invention is particularly advantageous for a large camera, but may also be used on a small camera. Also, the focusing unit can be used without the sports finder unit and vice versa. It will be obvious to those skilled in the art that various changes may be made, particularly in the supporting means, without departing from the scope and sphere of the invention and therefore the invention is not to be limited to what is shown in the drawing and described in the specification, but only as indicated in the appended claims.

What is claimed is:

1. A camera capable of accurately taking extreme close-ups free of parallax or while being hand held, comprising a linearly movable taking lens; a sports-finder view frame mounted for relative movement with said taking lens over a distance approximately at least twice as great as the distance of movement of said taking lens; supporting means for maintaining said lens and said view frame in synchronized position along any point of linear travel of said taking lens and for maintaining said taking lens and said view frame both over the same field of vision free of parallax and the same size field of vision regardless of the linear position of said taking lens, said supporting means comprising framework means to support said taking lens and means to progressively move said view frame in a downward arc from a position behind the plane of said taking lens at infinity focus to a position in front of the plane of said taking lens at close-up focus; a peep-sight for cooperation with said view frame; and means to move said taking lens linearly while simultaneously changing the position of said supporting means to maintain said lens and view frame in proper relative position.

2. A camera in accordance with claim 1 further comprising a focusing unit located between said view frame and said taking lens when said camera is at infinity focus, said focusing unit including a focusing lens of shorter focal length than said taking lens supported on said framework means for linear movement with said taking lens; said supporting means comprising means to progressively tilt said focusing lens to a downward pointing direction as said lenses are moved linearly from infinity focus to close-up focus so that said lenses focus on the same subject during linear travel of said lenses, the field of vision through said focusing unit lying within the field of vision seen through said peep-sight and view frame at close-up focus.

3. A camera in accordance with claim 2 wherein said focusing unit further comprises a ground glass cooperating with said focusing lens, said ground glass being approximately coplanar with the film in said camera; said supporting means further comprising means to progressively raise said ground glass in an arc at the same rate that said focusing lens is tilted to a downwardly pointed direction so that the planes of said ground glass and focusing lens are maintained parallel to maintain the exact center point on said ground glass identical with the exact center point of the film behind said taking lens regardless of the focus of said camera.

4. A camera capable of accurately taking extreme close-ups free of parallax while being hand held, comprising a linearly movable taking lens; a sports-finder view frame mounted for movement with said taking lens; a peep-sight cooperating with said view frame, said peep sight being approximately coplanar with the film in said camera at infinity focus; supporting means for maintaining said lens and said view frame in synchronized position along any point of linear travel of said taking lens and for maintaining said taking lens and said view frame both over the same field of vision, free of parallax and the same size field of vision regardless of the linear position of said taking lens, said supporting means comprising framework means to support said taking lens and means to progressively move said view frame in a downward arc from a position behind the plane of said taking lens at infinity focus to a position in front of the plane of said taking lens at close-up focus, said supporting means further comprising means to progressively move said peep-sight upwardly and tilt said peep-sight downwardly as said view frame moves in an arc forwardly and downwardly; and means to move said taking lens linearly while simultaneously changing the position of said supporting means to maintain said lens and view frame in proper relative position.

5. A camera in accordance with claim 4 further comprising an eye piece mounted behind said ground glass.

6. A camera in accordance with claim 4 wherein said means to move said view frame in an arc accelerates the rate of downward drop of said view frame towards close-up focus.

7. A camera in accordance with claim 4 wherein said view frame is located at about one-half the distance between the film plane and framework means at infinity focus.

8. A camera in accordance with claim 4 wherein said view frame is about one-third smaller than the film size.

9. A camera in accordance with claim 4 wherein said view frame is maintained parallel to the plane of said taking lens.

10. A camera in accordance with claim 4 wherein said supporting means including said means to progressively move said view frame and said means to move said peep-sight comprises a first support arm rigidly mounted on the body of said camera, a second arm pivotally mounted for rotation on said first support arm and pivotally supporting said peep-sight at one extremity thereof, a first linkage pivotally mounted at one extremity thereof on said second arm, a third support arm pivotally mounted at one extremity thereof on the body of said camera and also pivotally mounted along an intermediate portion to the other extremity of said first linkage, a second linkage pivotally mounted at one extremity thereof to the other extremity of said third arm, a fourth support arm rigidly mounted with said framework means for movement therewith having the other extremity of said second linkage pivotally mounted thereon, a curved rod linkage pivotally mounted on said fourth arm, a third linkage having one extremity pivotally mounted on said third arm and the other extremity pivotally mounted on one extremity of said curved rod linkage, a fifth arm pivotally mounted with said fourth arm for movement therewith and at one extremity pivotally supporting said view frame, a fourth linkage pivotally mounted at one extremity thereof to the other extremity of said curved rod linkage and being pivotally connected to said fifth arm, and a sixth arm pivotally connected at one extremity to the other extremity of said fourth linkage and at its other extremity pivotally connected to said view frame a distance from the pivotal connection with said fifth arm.

11. A camera in accordance with claim 10 comprising as part of said supporting means a bracing bar pivotally connected between said third arm and said framework means.

12. A camera in accordance with claim 10 further comprising a focusing lens supported on said framework means for linear movement with said taking lens, a ground glass cooperating with said focusing lens pivotally mounted on said second arm, said ground glass being approximately coplanar with the film in said camera; said supporting means serving to progressively tilt said focusing lens to a downward pointing direction as said taking and focusing lenses are moved linearly from infinity focus to close-up focus so that said taking and focusing lenses focus on the same subject during linear travel thereof, said supporting means further serving to progressively raise said ground glass in an arc at the same rate that said focusing lens is tilted to a downwardly pointing direction so that the planes of said ground glass and focusing lenses are maintained parallel, said supporting means further comprising a straight line expanding and contracting means between said focusing lens and said ground glass.

13. A camera in accordance with claim 12 comprising bellows between said ground glass and focusing lens wherein said straight line expanding and contracting means lies within said bellows and comprises a first leg rigidly mounted at one side of said ground glass, a second leg parallel to said first leg rigidly mounted at said focusing lens, a first pair of parallel rods pivotally mounted on said first leg and spaced apart from one another; a second pair of parallel rods pivotally mounted on said second leg and spaced apart from one another, each of said second pair of parallel rods being pivotally connected to a different arc of said first pair of parallel rods; and a third pair of parallel rods, one of said third pair being pivotally mounted between said first pair of parallel rods and the other of said third pair being pivotally mounted between said second pair of parallel rods.

References Cited
UNITED STATES PATENTS

| | | | |
|---|---|---|---|
| 1,856,432 | 5/1932 | Rudolph | 95—45 |
| 2,123,494 | 7/1938 | Barnack | 95—44 |
| 2,157,547 | 5/1939 | Leitz | 88—1.5 |
| 2,355,136 | 8/1944 | Bedford | 95—44 |
| 2,552,244 | 5/1951 | White | 95—44 |
| 2,649,038 | 8/1953 | Blue | 95—44 |

FOREIGN PATENTS 543,554  6/1922  France.

JOHN M. HORAN, *Primary Examiner.*